(12) United States Patent
Billman et al.

(10) Patent No.: US 11,475,516 B2
(45) Date of Patent: Oct. 18, 2022

(54) DISTRIBUTED RISK RULES

(71) Applicant: Comenity LLC, Columbus, OH (US)

(72) Inventors: Christian Billman, Gahanna, OH (US); Uchenna Chilaka, Blacklick, OH (US); Tom Pugh, Powell, OH (US)

(73) Assignee: Comenity LLC, Columbus, OH (US)

( * ) Notice: Subject to any disclaimer, the term of this patent is extended or adjusted under 35 U.S.C. 154(b) by 52 days.

(21) Appl. No.: 16/723,968

(22) Filed: Dec. 20, 2019

(65) Prior Publication Data
US 2020/0372573 A1    Nov. 26, 2020

Related U.S. Application Data

(60) Provisional application No. 62/851,982, filed on May 23, 2019.

(51) Int. Cl.
*G06Q 40/00* (2012.01)
*G06Q 40/02* (2012.01)
*G06N 5/02* (2006.01)

(52) U.S. Cl.
CPC .......... *G06Q 40/025* (2013.01); *G06N 5/025* (2013.01)

(58) Field of Classification Search
CPC .............................. G06Q 40/025; G06N 5/025
See application file for complete search history.

(56) References Cited

U.S. PATENT DOCUMENTS

| | | | | |
|---|---|---|---|---|
| 7,707,089 B1 * | 4/2010 | Barton | ................. | G06Q 20/105 705/35 |
| 8,554,631 B1 * | 10/2013 | Barton | ............... | G06Q 20/4016 705/16 |
| 9,760,861 B2 * | 9/2017 | Boding | ................. | G06Q 40/02 |
| 10,375,078 B2 * | 8/2019 | Burke | ................. | H04L 63/1425 |
| 2008/0021787 A1 * | 1/2008 | Mackouse | ............ | G06Q 20/204 705/17 |
| 2010/0017328 A1 * | 1/2010 | Stephen | ................. | G06Q 20/40 705/43 |
| 2010/0169163 A1 * | 7/2010 | Alvin | ................. | G06Q 30/0603 705/38 |
| 2013/0013514 A1 * | 1/2013 | Mackouse | ............. | G06Q 20/24 705/44 |

(Continued)

FOREIGN PATENT DOCUMENTS

| | | | | |
|---|---|---|---|---|
| JP | 2004-86915 | * | 3/2004 | ............. G06Q 50/10 |
| WO | WO-2018193085 A1 | * | 10/2018 | ......... G06Q 20/4016 |

OTHER PUBLICATIONS

Wasserkrug et al., "Efficient Processing of Uncertain Events in Rule-Based Systems," IEEE Transactions on Knowledge and Data Engineering, vol. 24, No. 1, Jan. 2012 (Year: 2012).*

(Continued)

*Primary Examiner* — Alexander G Kalinowski
*Assistant Examiner* — William B. Bunker (57) ABSTRACT

A system and method for distributed risk rules is disclosed. The method receives, at a subsystem, a subset of rules from a main rules system. The subsystem then determines that a communication to the main rules system is disrupted. The subsystem utilizes the subset of rules to make at least one business decision. After determining that the communication to the main rules system is operational, the subsystem provides a reconciliation data file including the at least one business decision to the main rules system.

20 Claims, 4 Drawing Sheets

(56) References Cited

U.S. PATENT DOCUMENTS

| | | | |
|---|---|---|---|
| 2015/0154570 A1* | 6/2015 | Dheer | G06Q 20/24 |
| | | | 705/44 |
| 2016/0098724 A1* | 4/2016 | Bishop | G06Q 20/382 |
| | | | 705/21 |
| 2016/0182277 A1* | 6/2016 | Carney | G06Q 20/425 |
| | | | 370/218 |
| 2017/0300903 A1* | 10/2017 | Mori | G06Q 10/067 |
| 2019/0220865 A1* | 7/2019 | Weber | G06Q 20/4016 |
| 2020/0394659 A1* | 12/2020 | Qu | G06Q 40/02 |

OTHER PUBLICATIONS

Guo et al., "Fraud Risk Monitoring System for E-Banking Transactions," 2018 IEEE 16th International Conference on Dependable, Automatic and Secure Computing, 2018 (Year: 2018).*

* cited by examiner

DISTRIBUTED RISK RULES

CROSS-REFERENCE TO RELATED APPLICATIONS (PROVISIONAL)

This application claims priority to and benefit of U.S. Provisional Patent Application No. 62/851,982 filed on May 23, 2019 entitled "DISTRUBUTED RISK RULES" by Billman et al., and assigned to the assignee of the present application, the disclosure of which is hereby incorporated by reference in its entirety.

BACKGROUND

Credit account systems will have a main rules system. This is the system that authorizes purchases, makes credit account approval and denial decisions, sets credit account limits, and the like. However, if communication with the main rules system goes down, a store that uses the main rules system will not be able to perform any authorized credit purchases or provide any customers with the opportunity to apply for a store credit account.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. In one embodiment, the computer-executable instructions are stored in a non-transitory computer-readable storage medium. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as "selecting", "outputting", "allowing," "limiting," "issuing," "preventing," "inputting", "providing", "receiving", "utilizing", "obtaining", "performing", "accessing", "authorizing" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

It should be appreciated that the obtaining, accessing, or utilizing of information conforms to applicable privacy laws (e.g., federal privacy laws, state privacy laws, etc.).

Embodiments described herein provide a novel method and system for distributing a "light" version of rules and authorization to one or more brands, so that if the main rules system goes down, the "light" rules that have been distributed to the brand can be to provide some reduced level of throughput instead of having the brand just turning down all aspects of credit authorization, approval and the like when the main rules system is down.

Importantly, the embodiments of the present invention, as will be described below, provide an approach for distributed rules which differs significantly from the conventional processes. In conventional approaches, if the main rules system was down, there was no ability for a brand to perform any credit related purchases, open any new credit accounts, or the like. As such, any communication disruption (whether accidental, weather related, purposeful (e.g., a denial of service attach) between the brand and the main rules system resulted in lost sales and frustration across the board. However, the embodiments described herein provide a distributed "light" rules system that allows some level of decisions to be made at the brand when communication between the brand and the main rules system is disrupted.

Thus, the embodiments described herein, provide a completely new and different use for a rules subsystem which is different than what was previously done because of the Internet-centric centralized aspect of the digital authorization process.

As will be described in detail, the various embodiments of the present invention do not merely implement conventional processes on a computing system. Instead, the various embodiments of the present invention, in part, provide a novel process for providing a "light" version of credit account rules and authorization which is necessarily rooted in Internet-centric computer technology to overcome a problem specifically arising due to communications disruptions in a digital communications environment.

Moreover, the embodiments do not recite a mathematical algorithm; nor do they recite a fundamental economic or longstanding commercial practice. Instead, they address a business challenge that has been born in the Internet-centric environment. Thus, the embodiments do not merely recite the performance of some business practice known from the pre-Internet world along with the requirement to perform it on a computing device. Instead, the embodiments are necessarily rooted in network-centric environments in order to overcome new problems specifically arising in the realm of credit account and reward account rules and authorization.

Operation

Figure 1:
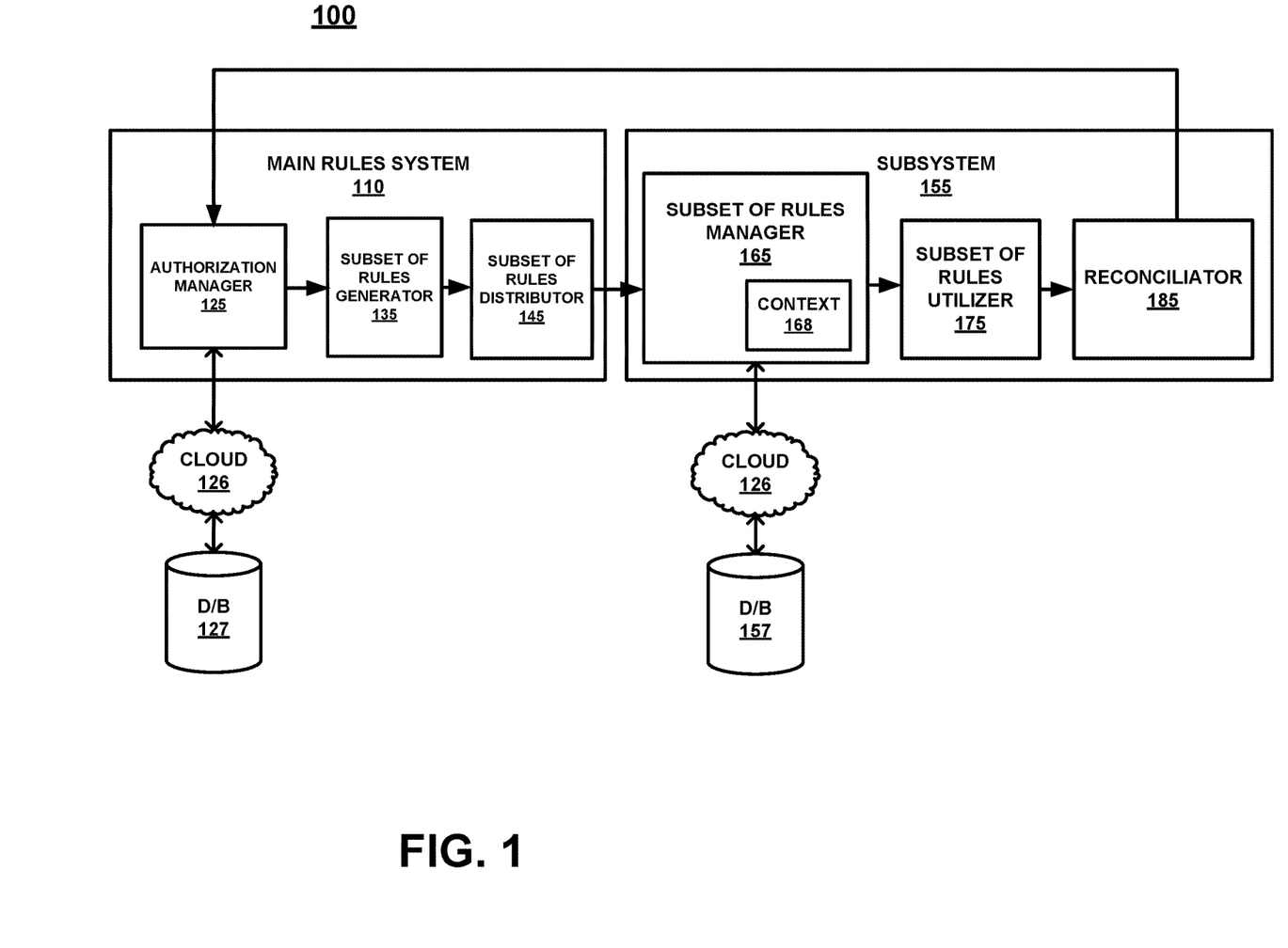
FIG. 1 is a block diagram of a distributed risk rules system, in accordance with an embodiment.

Referring now to FIG. 1, a block diagram of a distributed risk rules system 100 is shown in accordance with an embodiment. In one embodiment, distributed risk rules system 100 includes a main rules system 110 and a subsystem 155. In one embodiment, the subset of rules and authorization criteria are distributed from the main rules system 110 to the subsystem 155 (e.g., a certain brand's computing system), so that if the main rules system 110 goes down, the "next best" rules that have been distributed to the brands (e.g., subsystem 155) can be used instead of the brand having to turn down all requests while the main rules system 110 is down. In one embodiment, subsystem 155 could be a point of sale (POS) system, a hand-held associate device, or the like. In one embodiment, subsystem 155 is a proprietary device that is in communication with the POS or the like, but whose stored data is inaccessible by any system or device other than proprietary authorization manager 125.

Main rules system 110 includes proprietary authorization manager 125, subset of rules generator 135, and subset of rules distributor 145. In one embodiment, main rules system 110 is a computing system such as computer system 400 described in detail in the FIG. 4 discussion herein.

In one embodiment, authorization manager 125 is a rules engine that uses information from one or more databases (such as database 127) to make credit account approval decisions, credit account authorization decisions, reward account determinations, and the like. In one embodiment, authorization manager 125 communicates with the one or more databases via cloud 126 which may be a LAN, WAN, Internet connection, or the like.

Subset of rules generator 135 works with authorization manager 125 to develop a subset of the authorization rules for one or more different brands. In one embodiment, the development of the subset of rules is brand dependent. For example, one brand may have a certain credit score requirement or other metric that is different than (or has a different value than) a second brand.

Once the subset of rules is generated, subset of rules distributor 145 will distribute the subset of rules to each subsystem 155. In one embodiment, the subset of rules will be distributed by subset of rules distributor 145 on a pre-defined schedule. In one embodiment, the subset of rules will only be distributed by subset of rules distributor 145 if a request is received from subsystem 155 or if there are changes that have been made to the subset of rules.

Subsystem 155 includes subset of rules manager 165, subset of rules utilizer 175, and reconciliator 185. In one embodiment, subsystem 155 is a computing system such as computer system 400 described in detail in the FIG. 4 discussion herein.

In one embodiment, subset of rules manager 165 will manage the storage of the subset of rules in one or more databases (such as database 157). In one embodiment, subset of rules manager 165 communicates with the one or more databases via cloud 126 which may be a LAN, WAN, Internet connection, or the like. In one embodiment, the one or more databases (such as database 157) include a credit bureau database that can provide a credit score, credit report information and the like. In one embodiment, the one or more databases (such as database 157) includes a third party fraud tools database that can provide fraud information.

In one embodiment, some consumer information from the credit account provider main rules system 110 databases (such as database 127) will also be distributed to the brands and would be stored in one or more databases (such as database 157). In one embodiment, the consumer information is prefetched by transactional context distributor 168. In one embodiment, transactional context distributor 168 is found in subset of rules manager 165 of subsystem 155. Although transactional context distributor 168 is shown in subsystem 155, in one embodiment, transactional context distributor 168 could be found in main rules system 110, such as working in conjunction with authorization manager 125, or the like. In yet another embodiment, transactional context distributor 168 could be used in both main rules system 110 and subsystem 155. In general, transactional context distributor 168 will manage the consumer information which would include information such as, but not limited to, customer contact information, current credit limit, open to buy, etc.

In one embodiment, the consumer information is only distributed to the customer's designated "store of loyalty", to stores that the customer has shopped in the past, to stores within a certain radius of the customer's home or work address (e.g., any brand store within a 10 mile radius), to stores in the customer's city, to stores within the customer's state, or the like. In so doing, not all customer information has to be distributed to all brand stores.

Thus, in one embodiment, by utilizing transactional context distributor 168 to prefetch or provide consumer data, some or all of the consumer information, e.g, the credit score, the credit report information, the fraud information, and the like would be available to subset of rules manager 165.

In one embodiment, subset of rules utilizer 175 is a rules engine that receives data from subset of rules manager 165. The data can include, but is not limited to, some or all of the consumer information, the credit score, the credit report information, the fraud information, the subset of rules, and the like. Subset of rules utilizer 175 will use the data received from subset of rules manager 165 to make credit account approval decisions, credit account authorization decisions, reward account determinations, and the like. For example, when the main rules system 110 is not available, subsystem 155 will be able to feed the application, credit charge authorization, or the like, into the subset of rules utilizer 175. The subset of rules utilizer 175 will obtain the necessary data from the subset of rules manager 165, and based on the data, will make a "best information available at the time" determination.

Reconciliator 185 will provide any decisions that are made by subset of rules utilizer 175 back to authorization manager 125 of main rules system 110 as part of a data file. In so doing, main rules system 110 will be able to maintain a record of each transaction, authorization, new account generation, or the like that was performed by subsystem 155. Moreover, authorization manager 125 will be able to provide an analysis of any of the new submissions from subsystem 155 using the full rules database.

The analysis could include the review of credit limits provided to new accounts and an option for the new account to receive a modification to the existing credit limit. The analysis could include a review of denied applications to see if there were other underlying aspects that would allow the customer to be sent a pre-approval or otherwise provided a second chance at obtaining the credit account. The analysis could include an updating of a reward activity based on other information that was not known to subsystem 155 which would result in a different reward being given to the customer, and the like.

Figure 2:
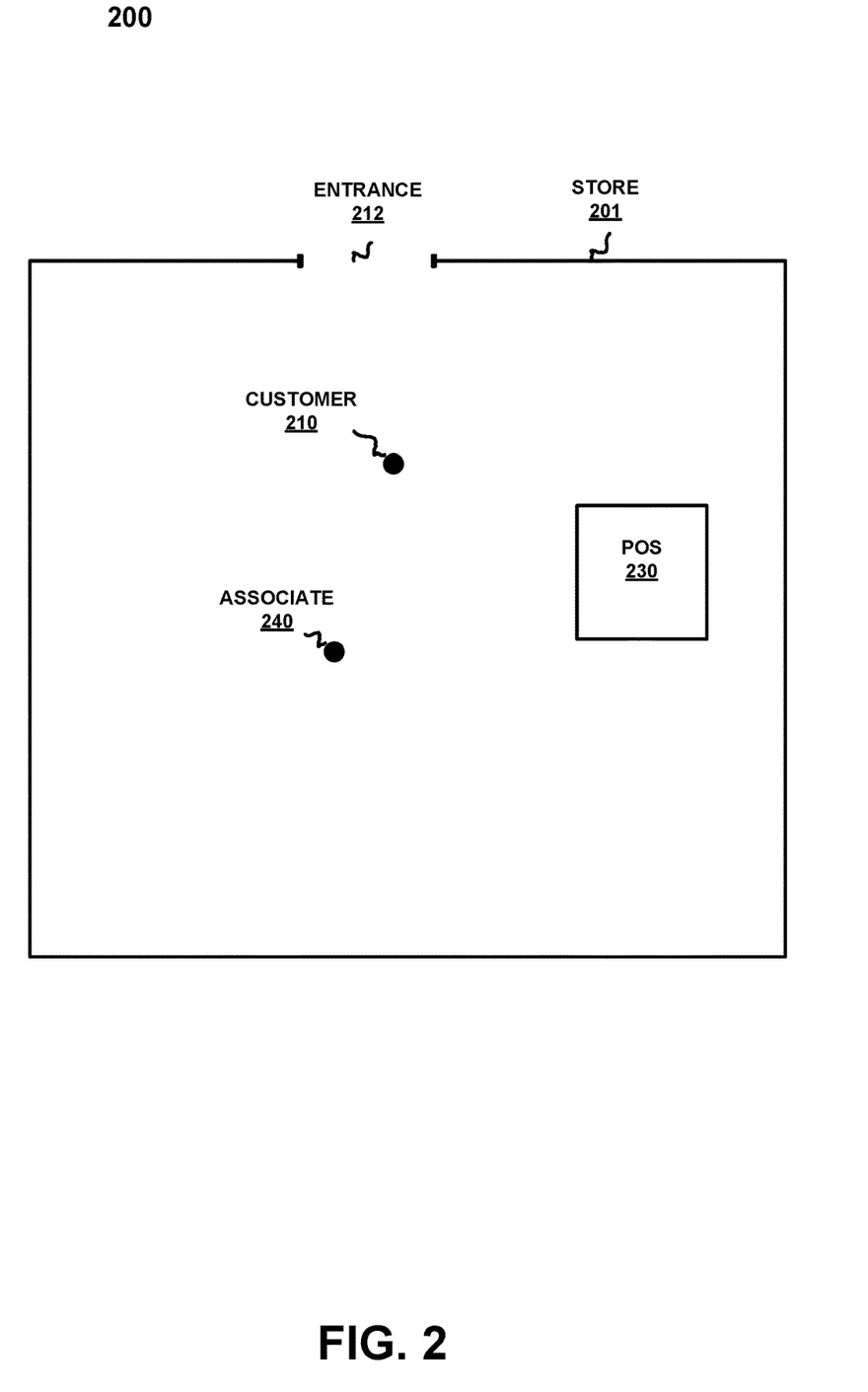
FIG. 2 is a top plan view of a retail store, in accordance with an embodiment.

Referring now to FIG. 2, a top plan view 200 of a store 201 is shown in accordance with an embodiment. In general, store 201 is any physical brick and mortar store that provides goods for sale at the store location. In one embodiment, store 201 includes an entrance 212. In addition, in different embodiments and configurations, store 201 can include one or more of, point of sale (POS) 230 (which could be a fixed location computing device, a store's mobile device, an electronic cash register, and the like), and an associate's mobile device 240.

Mobile device 240 (and in some cases POS 230) could be a smart phone, a tablet, a smart watch, a piece of smart jewelry, smart glasses, or other user portable devices having wireless connectivity In one embodiment, POS 230 and associate device 240 are connected to a network (e.g., Internet, local area network (LAN, or the like), via near field communication (NFC), Bluetooth, WiFi, or the like. Although a number of examples are provided, the network and connections are not limited to only those examples.

In one embodiment, the result of the customer 210 is a customer (or a customer with a mobile device) who is attempting to accomplish a task that is normally controlled by the main rules system 110, such as, but not limited to, making a credit payment, applying for a credit account, redeeming a reward from a reward program, adding the purchase points to a reward program, or the like.

Figure 3:
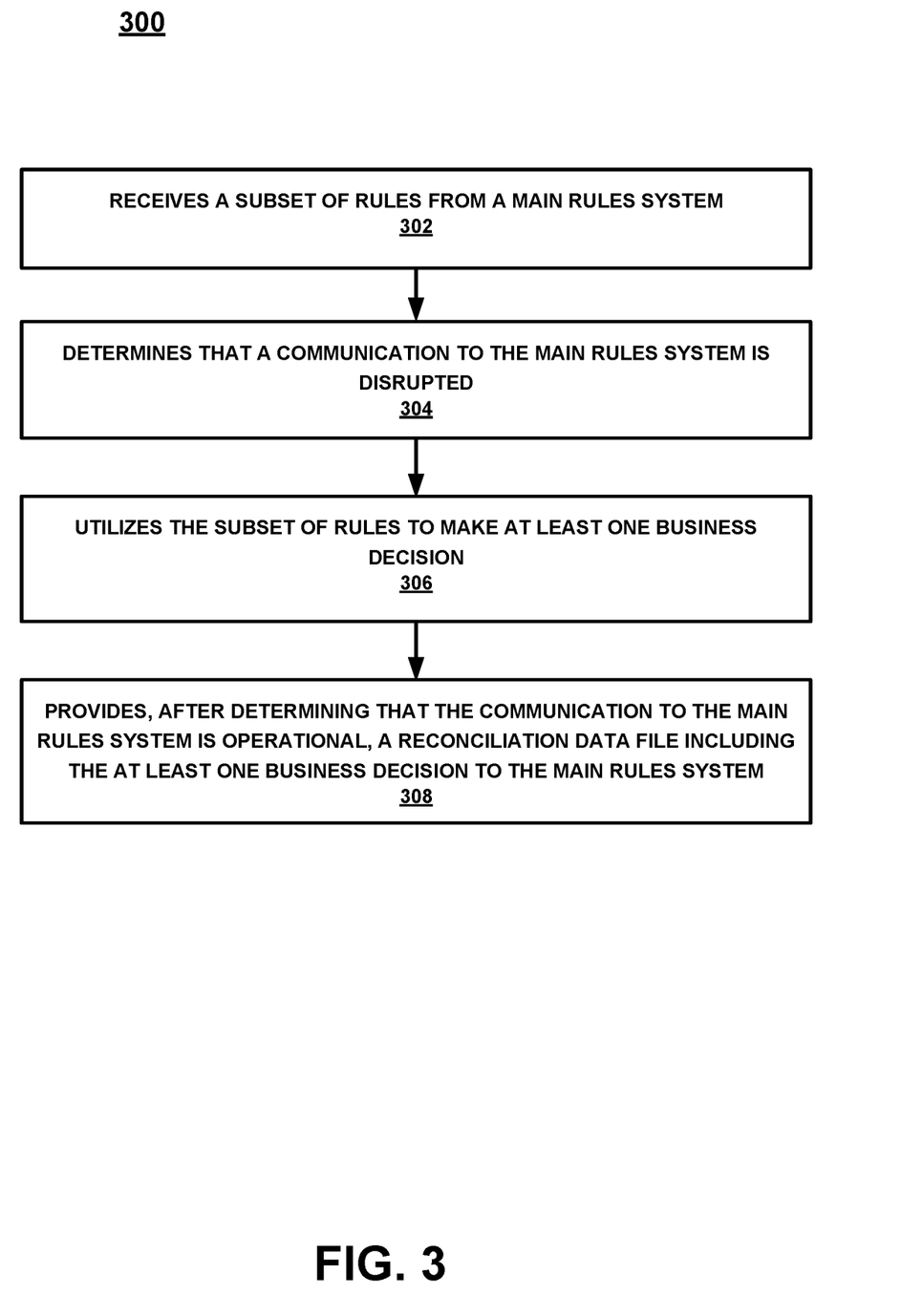
FIG. 3 is a flowchart of a method for providing distributed risk rules, in accordance with an embodiment.

With reference now to FIG. 3, a flowchart 300 of a method for providing distributed risk rules is shown in accordance with an embodiment. For example, one embodiment distributes out a subset of the rules and authorizations to the different brands (e.g., subsystem 155), so that if the main rules system 110 goes down, the subset of rules and authorizations that have been distributed to the subsystem 155 are used instead of just turning down all operations. The subset of rules could be distributed to subsystem 155 such as point of sale (POS) systems, hand-held associate devices, or the like.

Referring now to 302 of FIG. 3, one embodiment receives a subset of rules from a main rules system 110. The subset of rules can include authorization rules, acquisition rules, private label rules, and the like. For example, subset of rules could include rules such as: risk, credit limit assignments, account number and credit limit assignments, authorization amounts available by account. further, the rules could be the same as the regular rules, could be a modification of the regular rules, or a combination thereof. For example, a modification of the regular rules could be a reduction in a credit limit for a new account that is generated by subsystem 155 using the subset of distributed rules. Because of the smaller database, and thus reduced fraud determination capability, in one embodiment, when the subset of distributed rules are used a normal opening account credit limit of 2500 dollars would be reduced to a lower amount. For example, the lower amount could be 500 dollars (or some other lesser number). Thus, the client would be able to apply and open an account and make a purchase, but the credit limit would be lower until the main rules system 110 had the chance to vet the customer/application.

In one embodiment, the subset of rules could be distributed on a schedule such as weekly, daily, monthly, or the like. In one embodiment, an updated subset of rules would be distributed only when a change to the subset of rules is made.

In one embodiment, the main rules system 110 distributes a plurality of different subset of rules to a plurality of different subsystems 155. For example, the subset of rules can differ by brand. The differences can include aspects such as different score thresholds and the like. These different rules are the ones that drive who is approved and the setting of the credit limit for the new account. These rules can include different criteria for one or more of the different brands and the underlying calculations that drive approval and credit limits are often proprietary. Thus, a different subsystem 155 would be analogous to a different brand. In one embodiment, each subsystem 155 is not going to receive the proprietary underlying calculations that are stored at the main rules system 110. Instead each subsystem 155 will receive a simplified or "light" version of the underlying proprietary methodology. In one embodiment, the subset of rules is provided in an encrypted (non-accessible) format.

With reference now to 304 of FIG. 3, one embodiment determines that a communication to the main rules system 110 is disrupted. For example, when the main rules system 110 is not available, the brands (or subsystem 155) will be able to feed the application, credit charge authorization, or the like, into the subset of rules utilizer. The subset of rules utilizer 175 will then allow the subsystem 155 to make a new account decision, receive an authorization, and the like.

In one embodiment, the subsystem 155 automatically determines that the communication to the main rules system 110 is disrupted after a pre-defined number of failed attempts to access the main rules system 110. For example, the determination could be made after 5 failed attempts. Although five failed attempts is used in one embodiment, it should be appreciated that the actual number of failed attempts could be different, could be defined by the main rules system 110, could be different for one or more different brands, or the like.

In one embodiment, the subsystem 155 automatically determines that the communication to the main rules system 110 is disrupted after a pre-defined time period has tolled without obtaining access to the main rules system 110. For example, the determination could be made after 3 minutes. Although 3 minutes is used in one embodiment, it should be appreciated that the actual time period could be different, could be defined by the main rules system 110, could be different for one or more different brands, could be different for different days (e.g., holidays, high sales volume days, or the like).

Referring now to 306 of FIG. 3, one embodiment utilizes the subset of rules to make at least one business decision. Thus, if the main rules system 110 goes down, the "next best" rules that have been distributed to subsystem 155 are used instead of just turning down all aspects of credit account use, reward card use, credit application approval, and the like. In one embodiment, distributing the rules to subsystem 155 can help to mitigate losses due to denial of service attacks, main rules system down times, weather related outages, and the like.

Since the distributed version is a "light" subset of the rules, the distributed subset of rules can have a higher established fraud risk threshold than the proprietary rules in main rules system 100 would provide. For example, when a customer applies for a credit account, one thing that can occur is the contacting of a credit bureau for a customer credit score. In the main rules system 110, the customer credit score would carry a certain weight. However, other customer aspects available to the main rules system 110 (e.g., a different brand account in the main rules system 110 with a good payment history, internal fraud tools/lists/flags, etc.) could help form the ultimate decision.

However, in the distributed rules subsystem 155 there may not be the access to the different brand account information. As such, in the distributed rules subsystem 155, subset of rules manager would only be able to reach the credit bureaus or external third party fraud tools. As such, the distributed rules subsystem would have less access to information which would mean the credit score (and any third party fraud inputs) would carry much or all of the weight in the decision making process. Thus, in one embodiment, a customer would qualify for a credit account in the main rules system 110, but the same customer would not qualify for the credit account based on the evaluation performed by distributed rules subsystem 155.

With reference now to 308 of FIG. 3, one embodiment determines that the communication to the main rules system 110 is operational and provides a reconciliation data file to the main rules system 110, a data file including the at least one business decision to the main rules system 110. In one embodiment, the reconciliation from the subsystem 155 to the main rules system 110 could occur when contact is reestablished, or it could occur on a schedule such as weekly, daily, monthly, or the like, or the reconciliation could be provided during a reconnection after a disconnect has occurred and the subsystem 155 has had to use the distributed rules.

In one embodiment, the subsystem 155 can be used as a fallback by the main rules system 110 such as a service request reroute to the distributed rules system from the main rules system 110 call centers. For example, when the main rules system 110 detects the telephone service factor (TSF) is unfavorable (or moving toward unfavorable numbers), the main rules system 110 can direct some of the phone traffic to one or more subsystem 155 to handle flexible phone authorization requests such as small credit limit increases or other limited risk decisions that would normally be handled by an associate on the authorization line.

Example Computer System

Figure 4:
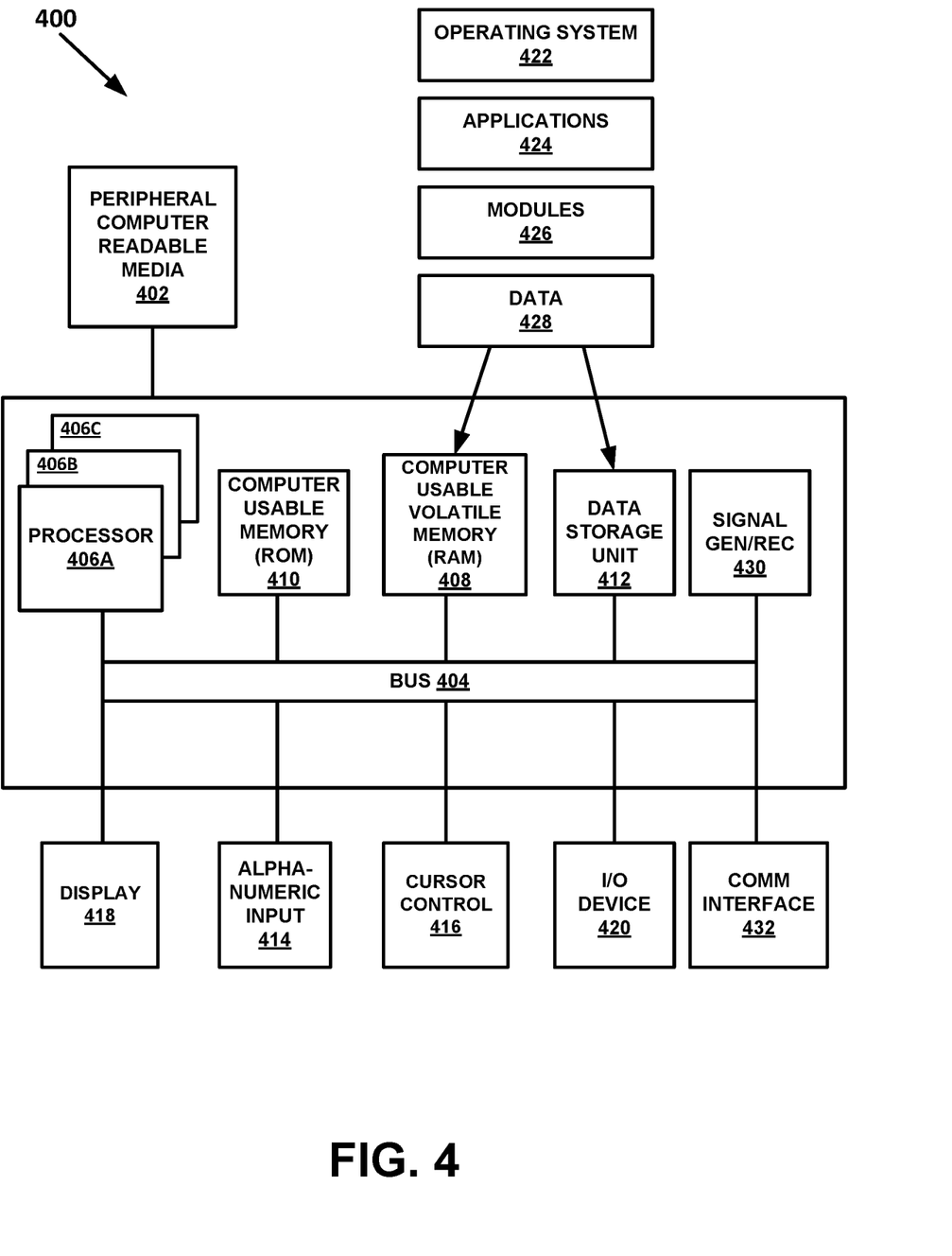
FIG. 4 is a block diagram of an example computer system with which or upon which various embodiments of the present invention may be implemented.

With reference now to FIG. 4, portions of the technology for providing a communication composed of computer-readable and computer-executable instructions that reside, for example, in non-transitory computer-readable medium (or storage media, etc.) of a computer system. That is, FIG. 4 illustrates one example of a type of computer that can be used to implement embodiments of the present technology. FIG. 4 represents a system or components that may be used in conjunction with aspects of the present technology. In one embodiment, some or all of the components described herein may be combined with some or all of the components of FIG. 4 to practice the present technology.

FIG. 4 illustrates an example computer system 400 used in accordance with embodiments of the present technology. It is appreciated that computer system 400 of FIG. 4 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 4, computer system 400 of FIG. 4 is well adapted to having peripheral computer readable media 402 such as, for example, a disk, a compact disc, a flash drive, and the like coupled thereto.

Computer system 400 of FIG. 4 includes an address/data/control bus 404 for communicating information, and a processor 406A coupled to bus 404 for processing information and instructions. As depicted in FIG. 4, computer system 400 is also well suited to a multi-processor environment in which a plurality of processors 406A, 406B, and 406C are present. Conversely, computer system 400 is also well suited to having a single processor such as, for example, processor 406A. Processors 406A, 406B, and 406C may be any of various types of microprocessors. Computer system 400 also includes data storage features such as a computer usable volatile memory 408, e.g., random access memory (RAM), coupled to bus 404 for storing information and instructions for processors 406A, 406B, and 406C.

Computer system 400 also includes computer usable non-volatile memory 410, e.g., read only memory (ROM), coupled to bus 404 for storing static information and instructions for processors 406A, 406B, and 406C. Also present in computer system 400 is a data storage unit 412 (e.g., a magnetic disk drive, optical disk drive, solid state drive (SSD), and the like) coupled to bus 404 for storing information and instructions. Computer system 400 also can optionally include an alpha-numeric input device 414 including alphanumeric and function keys coupled to bus 404 for communicating information and command selections to processor 406A or processors 406A, 406B, and 406C. Computer system 400 also can optionally include a cursor control device 416 coupled to bus 404 for communicating user input information and command selections to processor 406A or processors 406A, 406B, and 406C. Cursor control device may be a touch sensor, gesture recognition device, and the like. Computer system 400 of the present embodiment can optionally include a display 418 coupled to bus 404 for displaying information.

Referring still to FIG. 4, display 418 of FIG. 4 may be a liquid crystal device, cathode ray tube, OLED, plasma display device or other display device suitable for creating graphic images and alpha-numeric characters recognizable to a user. Cursor control device 416 allows the computer user to dynamically signal the movement of a visible symbol (cursor) on display 418. Many implementations of cursor control device 416 are known in the art including a trackball, mouse, touch pad, joystick, non-contact input, gesture recognition, voice commands, bio recognition, and the like. In addition, special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

Computer system 400 is also well suited to having a cursor directed by other means such as, for example, voice commands. Computer system 400 also includes an I/O device 420 for coupling computer system 400 with external entities. For example, in one embodiment, I/O device 420 is a modem for enabling wired or wireless communications between computer system 400 and an external network such as, but not limited to, the Internet or intranet. A more detailed discussion of the present technology is found below.

Referring still to FIG. 4, various other components are depicted for computer system 400. Specifically, when present, an operating system 422, applications 424, modules 426, and data 428 are shown as typically residing in one or some combination of computer usable volatile memory 408, e.g. random-access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present technology, for example, is stored as an application 424 or module 426 in memory locations within RAM 408 and memory areas within data storage unit 412. The present technology may be applied to one or more elements of described computer system 400.

Computer system 400 also includes one or more signal generating and receiving device(s) 430 coupled with bus 404 for enabling computer system 400 to interface with other electronic devices and computer systems. Signal generating and receiving device(s) 430 of the present embodiment may include wired serial adaptors, modems, and network adaptors, wireless modems, and wireless network adaptors, and other such communication technology. The signal generating and receiving device(s) 430 may work in conjunction with one (or more) communication interface 432 for coupling information to and/or from computer system 400. Communication interface 432 may include a serial port, parallel port, Universal Serial Bus (USB), Ethernet port, Bluetooth, thunderbolt, near field communications port, WiFi, Cellular modem, or other input/output interface. Communication interface 432 may physically, electrically, optically, or wirelessly (e.g., via radio frequency) couple computer system 400 with another device, such as a mobile phone, radio, or computer system.

Computer system 400 is only one example of a suitable computing environment and is not intended to suggest any limitation as to the scope of use or functionality of the present technology. Neither should the computing environment be interpreted as having any dependency or requirement relating to any one or combination of components illustrated in the example computer system 400.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method for distributing risk rules for making credit account approval and authorization decisions for transactions between a customer of a store having a first brand, the customer having a credit account with the store, the method comprising:
developing, by a main rules computing system, a main set of rules comprising a full set of rules for making approval and authorization credit decisions;
developing, by the main rules computing system, a plurality of subsets of the main rules for approving or authorizing credit account transactions for a plurality of brands, wherein each subset of rules comprises simplified criteria selected by each brand for making approval or authorization credit decisions for transactions executed at the stores of each brand, wherein the criteria are based on credit-related metrics relating to the customers of each store;
authorizing, by the main rules computing system, an electronic distribution of a first subset of the main rules to a store's POS computer system of the first brand;
pre-fetching and storing, by the store's POS computer system, transactional context information relating to the customer, wherein the transactional context information comprises customer account information and customer credit data;
receiving, at the store's POS computer system, the first subset of the main rules from the main rules computing system;
determining, at the store's POS computer system, that an electronic communication to the main rules computing system is disrupted;
utilizing, at the store's POS computer system, using the customer transactional context information, the first subset of the main rules to make at least one credit account decision relating to the customer while said electronic communication to said main rules computing system is disrupted, wherein the decision is based on the best customer transactional context information available at the time;
determining, at the store's POS computer system, that said electronic communication to said main rules computing system is operational;
providing, from said store's POS computer system and to said main rules computing system and after said determining that the electronic communication to the main rules computing system is operational, a reconciliation data file including the at least one credit account decision made by the store's POS computer system;
analyzing, by the main rules computing system, the reconciliation data file, using the main set of rules, wherein the analyzing comprises determining if the at least one credit account decision received from said store's POS computer system in said reconciliation data file should be corrected or modified, wherein the correction or modification comprises credit related changes to the transaction involving the customer; and
modifying, at said main rules computing system, said at least one credit account decision received from said store's POS computer system, based on said analysis of said at least one credit account decision in light of said main set of rules.

2. The method of claim 1, wherein receiving the first subset of the main rules comprises:
receiving at least one authorization rule;
receiving at least one acquisition rule; and
receiving at least one private label rule.

3. The method of claim 1, wherein receiving the first subset of the main rules comprises:
receiving at least one risk rule;
receiving at least one credit limit assignment rule;
receiving at least one account number having a credit limit assignment rule; and
receiving at least one authorization amount available by account rule.

4. The method of claim 1, further comprising:
automatically determining that the electronic communication to the main rules computing system is disrupted after a pre-defined number of failed attempts to contact the main rules computing system.

5. The method of claim 1, further comprising:
automatically determining that the electronic communication to the main rules computing system is disrupted after a pre-defined time period has tolled without obtaining contact with the main rules computing system.

6. The method of claim 1, wherein receiving the first subset of the main rules further comprises:
receiving a light version of an underlying proprietary methodology in an encrypted format.

7. The method of claim 6, further comprising:
receiving the first subset of the main rules at a proprietary device communicatively coupled with said store's POS computer system, wherein any data stored on said proprietary device is inaccessible by any other electronic device at said store's POS computer system.

8. A non-transitory computer-readable medium for storing instructions, the instructions comprising:
one or more instructions which, when executed by one or more processors of a store's POS computer system, cause one or more processors to:
receive, at the store's POS computer system and from a main rules computing system, a first subset of main rules of a main set of rules developed by said main rules computing system, the main set of rules comprising a full set of rules for making approval and authorization credit decisions, a plurality of subsets of the main rules developed by said main rules computing system, said plurality of subsets of the main rules for approval or authorization of credit account transactions for a plurality of brands, wherein each subset of rules comprises simplified criteria selected by each brand for making approval or authorization credit decisions for transactions executed at the stores of each brand, wherein the criteria are based on credit-related metrics relating to customers of each store, wherein the main rules computing system authorized an electronic distribution of the first subset of the main rules to the store's POS computer system of a first brand;
pre-fetch and store transactional context information relating to a customer, wherein the transactional context information comprises customer account information and customer credit data;
access a first subset of a main set of rules received from a main set of rules at a main rules computing system;
determine that an electronic communication to the main rules computing system is disrupted;
utilize, using the customer transactional context information, the first subset of the main rules to make at least one credit account decision relating to the customer while said electronic communication to said main rules computing system is disrupted, wherein the decision is based on the best customer transactional context information available at the time;
determine that said electronic communication to said main rules computing system is operational;
provide, to said main rules computing system and after said determination that the electronic communication to the main rules computing system is operational, a reconciliation data file including the at least one credit account decision made by the store's POS computer system;
use said main set of rules at said main rules computing system to analyze said reconciliation data file, wherein the analysis comprises a determination of whether said at least one credit account decision received from said store's POS computer system in said reconciliation data file should be corrected or modified, wherein the correction or modification comprises credit related changes to the transaction involving the customer; and modify, at said main rules computing system, said at least one credit account decision received from said store's POS computer system, based on said analysis of said at least one credit account decision in light of said main set of rules.

9. The non-transitory computer-readable medium of claim 8, where the first subset of the main rules comprises: at least one authorization rule; at least one acquisition rule; and at least one private label rule.

10. The non-transitory computer-readable medium of claim 8, where the first subset of the main rules comprises: at least one risk rule; at least one credit limit assignment rule; at least one account number having a credit limit assignment rule; and at least one authorization amount available by account rule.

11. The non-transitory computer-readable medium of claim 8, where the one or more instructions further cause one or more processors to:
automatically determine that the electronic communication to the main rules computing system is disrupted after a pre-defined number of failed attempts to contact the main rules computing system.

12. The non-transitory computer-readable medium of claim 8, where the one or more instructions further cause one or more processors to:
automatically determine that the electronic communication to the main rules computing system is disrupted after a pre-defined time period has tolled without obtaining contact with the main rules computing system.

13. The non-transitory computer-readable medium of claim 8, wherein the first subset of the main rules are in an encrypted format, the first subset of the main rules comprising a light version of an underlying proprietary methodology.

14. The non-transitory computer-readable medium of claim 8, where the one or more instructions further cause one or more processors to:
utilize the first subset of the main rules via a proprietary device communicatively coupled with said store's POS computer system, wherein any data stored on said proprietary device is inaccessible by any other electronic device at said store's POS computer system.

15. A system comprising:
a main rules computing system comprising:
a memory;
an electronic communications capability;
a storage, to store a main set of rules; and
one or more processors to:
develop a main set of rules comprising a full set of rules for making approval and authorization credit decisions;
develop a plurality of subsets of the main rules for approving or authorizing credit account transactions for a plurality of brands, wherein each subset of rules comprises simplified criteria selected by each brand for making approval or authorization credit decisions for transactions executed at the stores of each brand, wherein the criteria are based on credit-related metrics relating to customers of each store; and
authorize an electronic distribution of a first subset of the main rules to a store's POS computer system of a first brand; and
said store's POS computer system comprising:
a memory; and
one or more processors to:

pre-fetch and store transactional context information relating to a customer, wherein the transactional context information comprises customer account information and customer credit data;

receive the first subset of the main rules from the main rules computing system;

determine that an electronic communication to the main rules computing system is disrupted;

utilize, using the customer transactional context information, the first subset of the main rules to make at least one credit account decision relating to the customer while said electronic communication to said main rules computing system is disrupted, wherein the decision is based on the best customer transactional context information available at the time;

determine that said electronic communication to said main rules computing system is operational; and provide, from said store's POS computer system and to said main rules computing system and after said determination that the electronic communication to the main rules computing system is operational, a reconciliation data file including the at least one credit account decision made by the store's POS computer system;

said one or more processors of said main rules computing system to:

use said main set of rules to analyze said reconciliation data file, wherein the analysis comprises a determination of whether said at least one credit account decision received from said store's POS computer system in said reconciliation data file should be corrected or modified, wherein the correction or modification comprises credit related changes to the transaction involving the customer; and modify said at least one credit account decision received from said store's POS computer system, based on said analysis of said at least one credit account decision in light of said main set of rules.

16. The system of claim 15, where the first subset of the main rules comprises: at least one authorization rule; at least one acquisition rule; and at least one private label rule.

17. The system of claim 15, where the first subset of the main rules comprises: at least one risk rule; at least one credit limit assignment rule; at least one account number having a credit limit assignment rule; and at least one authorization amount available by account rule.

18. The system of claim 15 where the one or more processors of said store's POS computer system are further to:

automatically determine that the electronic communication to the main rules computing system is disrupted after a pre-defined number of failed attempts to contact the main rules computing system.

19. The system of claim 15 where the one or more processors of said store's POS computer system are further to:

automatically determine that the electronic communication to the main rules computing system is disrupted after a pre-defined time period has tolled without obtaining contact with the main rules computing system.

20. The system of claim 15 where said store's POS computer system comprises:

a proprietary device communicatively coupled with said store's POS computer system, the proprietary device to store said first subset of the main rules; and any data stored on said proprietary device is inaccessible by any other electronic device at said store's POS computer system.

* * * * *